Jan. 24, 1967 G. W. MISSON 3,300,291
APPARATUS FOR PRODUCING SHEET GLASS
Filed June 11, 1964 5 Sheets-Sheet 2

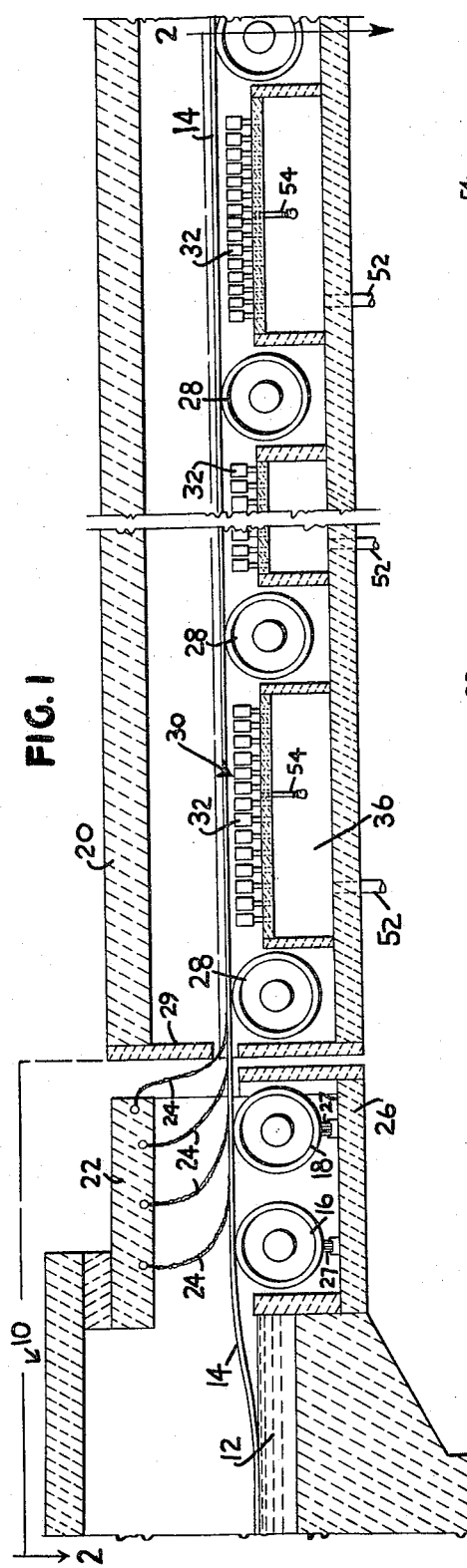
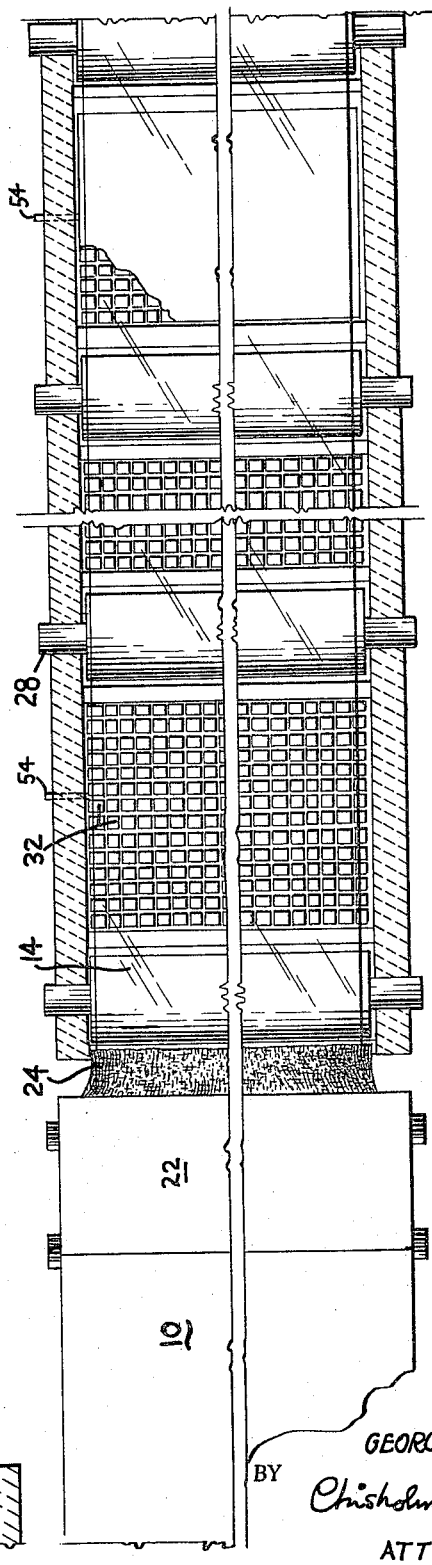

INVENTOR.
GEORGE W. MISSON
BY Chisholm and Spencer
ATTORNEYS

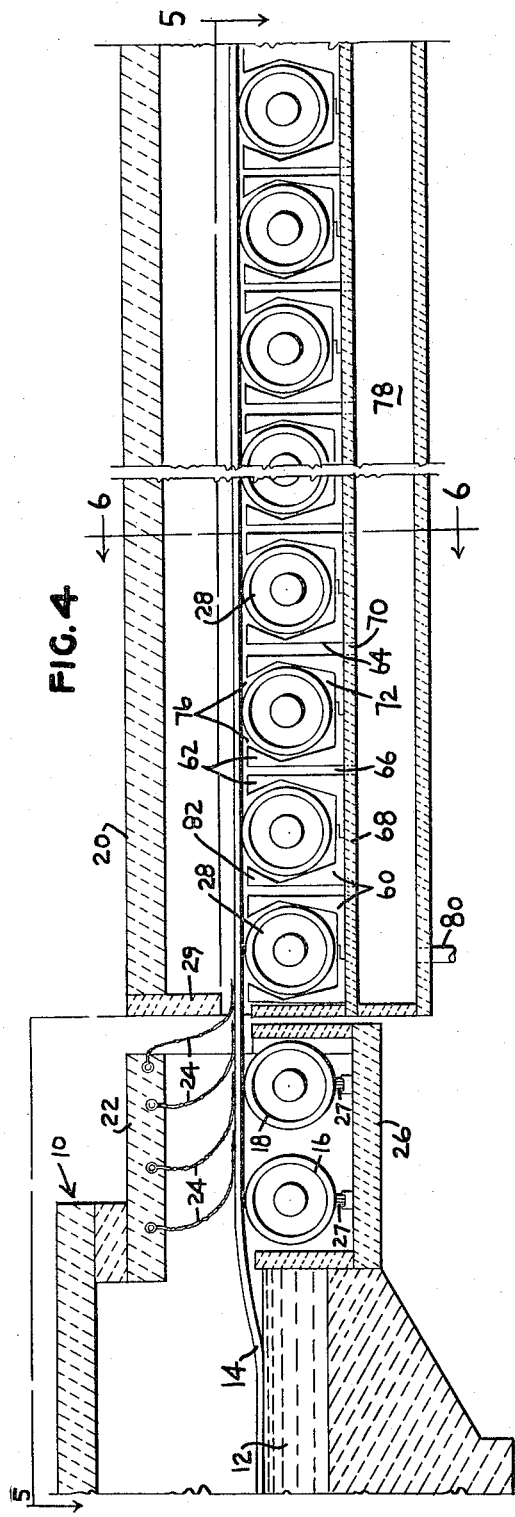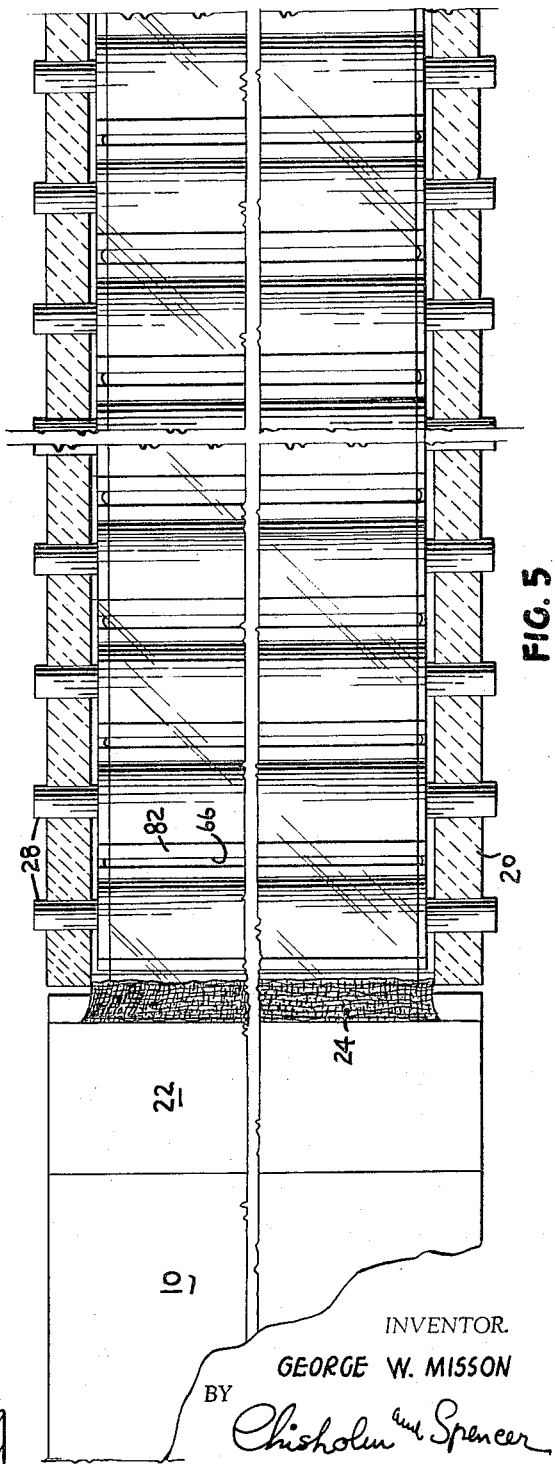

INVENTOR.
GEORGE W. MISSON

Jan. 24, 1967 G. W. MISSON 3,300,291
APPARATUS FOR PRODUCING SHEET GLASS
Filed June 11, 1964 5 Sheets-Sheet 5
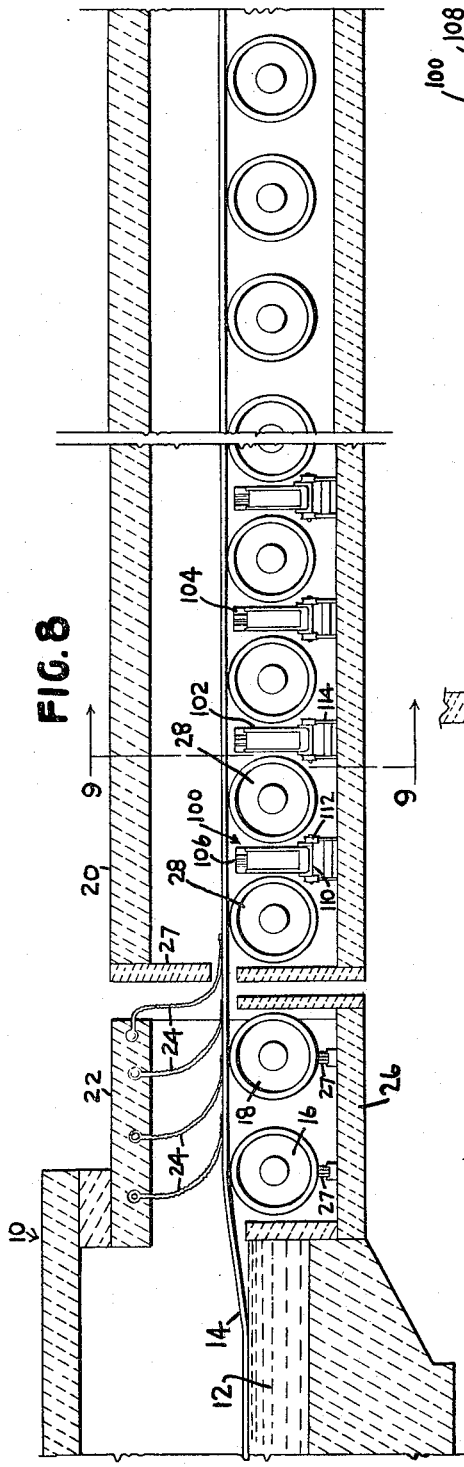
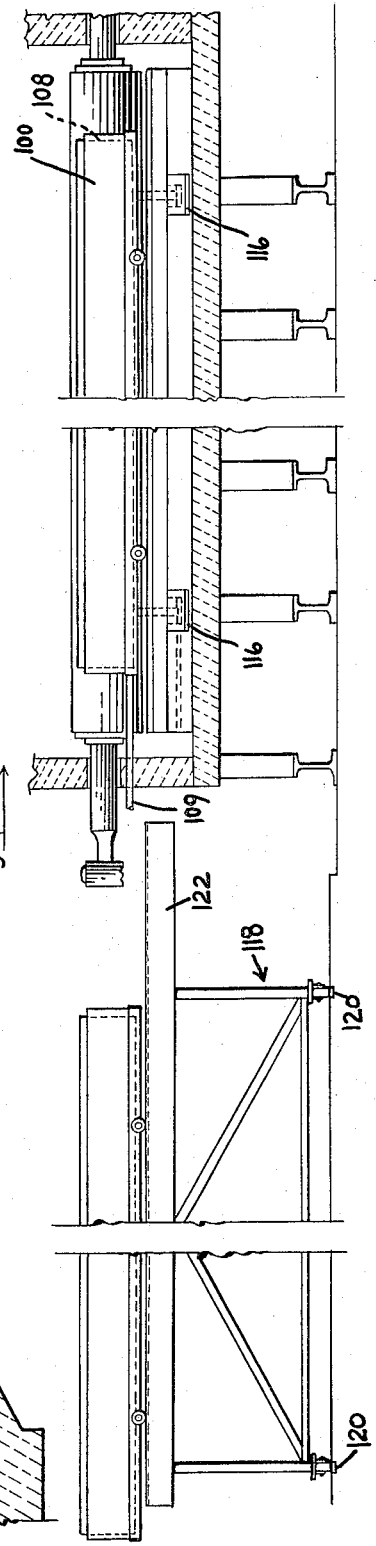
INVENTOR.
GEORGE W. MISSON
Chisholm and Spencer
ATTORNEYS

United States Patent Office 3,300,291
Patented Jan. 24, 1967

3,300,291
APPARATUS FOR PRODUCING SHEET GLASS
George W. Mission, Pittsburgh, Pa., assignor to Pittsburgh Plate Glass Company, Pittsburgh, Pa., a corporation of Pennsylvania
Filed June 11, 1964, Ser. No. 374,408
1 Claim. (Cl. 65—159)

This application relates to the manufacturing of flat glass by floating glass on a liquid bath, such as molten metal, so that the resultant flat glass has fire-finished surfaces requiring little or no additional surfacing for ultimate use. The product produced by the float process is known as float glass.

In the known float process, glass, either as a mass of molten glass in ribbon form, or as a formed ribbon of glass, both of which can be referred to as a "ribbon of glass" or a "glass ribbon," is discharged onto a liquid bath, generally of molten metal, such as tin or a tin alloy, contained within a tank, and, after a period of time sufficient for the glass ribbon to at least achieve its desired surface finish, the finished glass ribbon is cooled and removed from the liquid bath. The finished glass ribbon is then annealed in an annealing lehr through which the ribbon is conveyed on lehr rolls which provide at least a part and generally the major part of the tractive force required to convey the glass through the tank containing the liquid bath. At the entrance end of the lehr, the glass of the ribbon has an elevated temperature of approximately 1050 degrees Fahrenheit to 1100 degrees Fahrenheit, and is subject to surface damage because of surface contact with mechanical handling or conveying equipment, such as the lehr rolls. One of the surface defects found by inspecting the finished glass ribbon is known as roll print or dross print caused probably by glass contact with the lehr rolls which have thereon uneven and crusty deposits. The lehr rolls, most severely affected are those near the lehr entrance. The deposits on the lehr rolls are thought to be tin compounds carried over from the treating tank, as perhaps tin-rich vapors which condense on the lehr rolls. The deposits occur even with precautions being taken to seal the tank atmosphere from the ambient atmosphere and the lehr atmosphere.

The defect known as roll or dross print is characterized by random surface fissures or fractures which may or may not be vented, as by having a tail thereon, or by skid marks, all of which are visible to the naked eye and cause rejection of the glass for ultimate use.

To eliminate or substantially reduce the described defect, so that if present it cannot be detected by the naked eye and the glass will not be rejected, it is proposed, according to this invention, to transfer the glass from the liquid bath to the annealing lehr and/or to convey the glass through the lehr, especially through the portion near the entrance thereof, on a film of a fluid, such as air, while still maintaining a tractive force on the glass. In other words, it is proposed to reduce the contact pressure between the glass and the conveying rolls and thus materially reduce surface damage due to pressure contact of the finished glass ribbon and the conveying rolls. The fluid, as its use is being described, will at least partially support the glass while the glass is subjected to conditions under which surface damage can occur. In addition to the virtual elimination of surface damage as described, the invention possesses other features to improve the manufacture of float glass. By controlling the temperature of the fluid supporting media at various locations in relation to the glass travel, it is possible to thermally condition the glass as desired. The annealing of the glass can thus be more precisely controlled. If desired, the fluid supporting media can contain coating compounds, so as to apply various coatings, which may require elevated or particular temperatures for their application, to the glass.

Other features of the invention will become apparent to one skilled in the art from the following description, and to further understand the invention and its many features, reference is made to the accompanying drawings, in which:

FIG. 1 is a longitudinal section of part of a float glass producing apparatus showing one embodiment of a partial gaseous supporting arrangement for a finished glass ribbon;

FIG. 2 is a horizontal sectional view taken on line 2—2 of FIG. 1;

FIG. 4 is a longitudinal section similar to FIG. 1 and illustrating another embodiment of the invention;

FIG. 5 is a horizontal sectional view taken on line 5—5 of FIG. 4;

FIG. 8 is a longitudinal section similar to FIG. 1 and illustrating still another embodiment of the invention;

FIG. 9 is a sectional view taken on line 9—9 of FIG. 8; and

Figure 3:
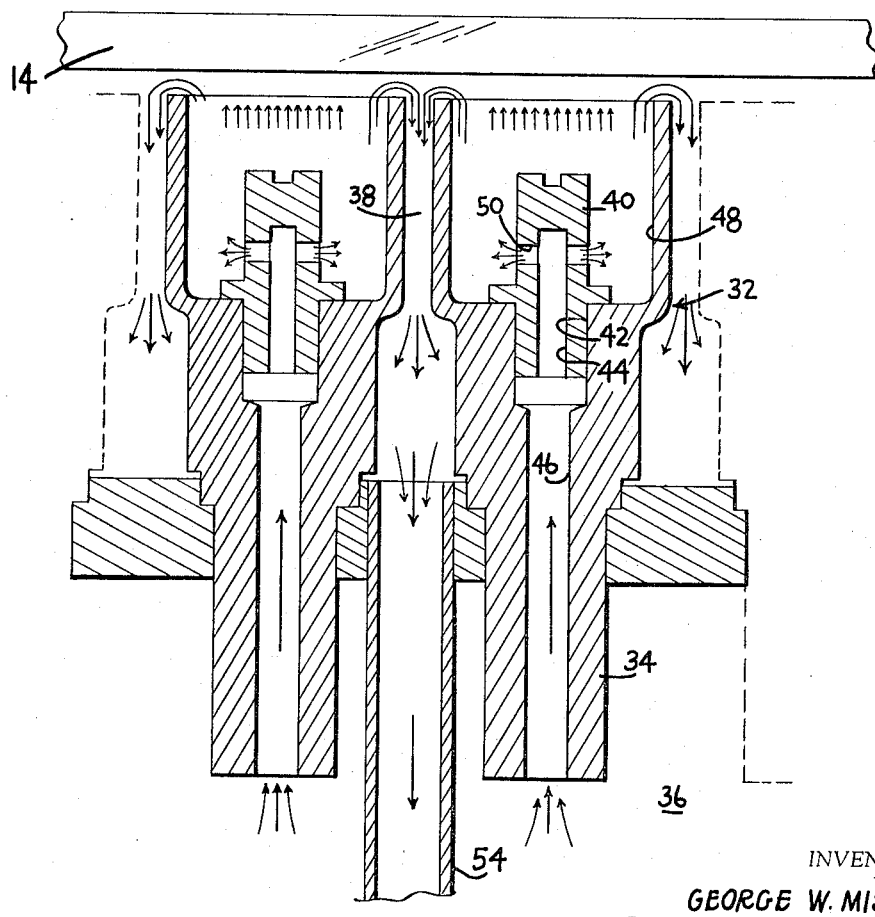
FIG. 3 is an enlarged sectional view showing details of the modular construction of the gaseous supporting means of FIGS. 1 and 2.
Figure 6:
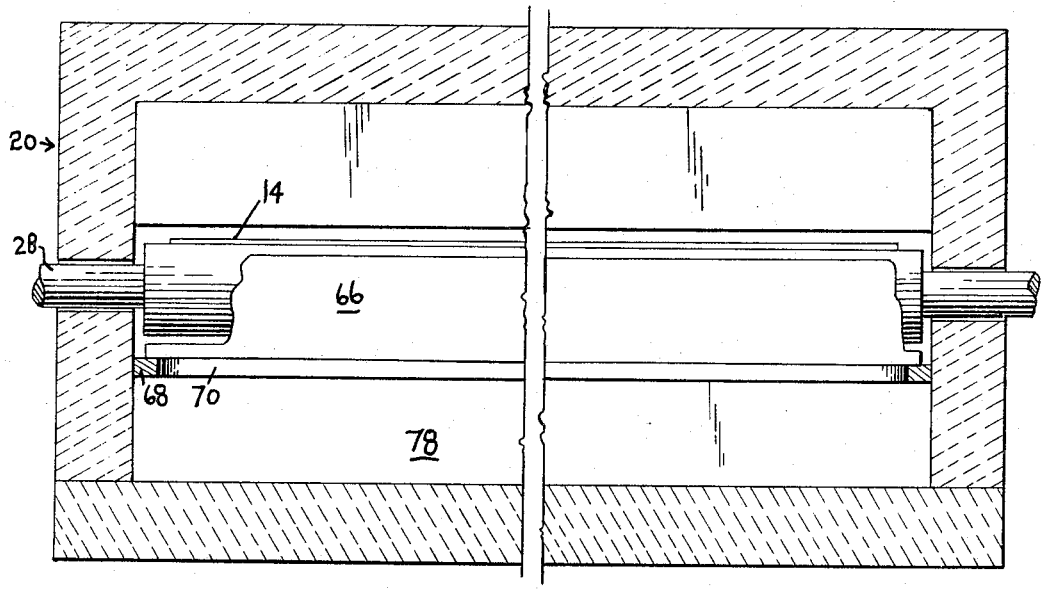
FIG. 6 is a sectional view taken on line 6—6 of FIG. 4.
Figure 7:
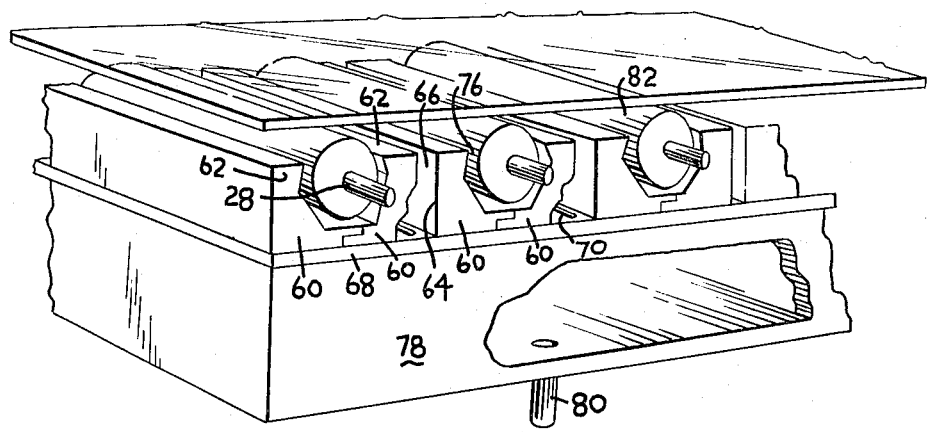
FIG. 7 is an enlarged perspective view of a portion of the embodiment of FIGS. 4, 5 and 6 illustrating constructional details of the gaseous discharge means.

Turning now to the drawings, and especially to the first illustrated embodiment as illustrated in FIGS. 1 to 3, there is shown in FIGS. 1 and 2, a glass sheet producing apparatus which includes a tank 10 containing a bath of liquid 12, such as a molten metal, on which a ribbon of glass 14 is supported. One molten metal which has been found suitable for the process is tin. An alloy of tin may also be used. The ribbon of glass 14 may be preformed and then discharged onto the liquid bath 12 or it may be formed on the liquid bath by discharging a molten mass of glass from a glass melting tank onto the liquid of the bath. In any event, the glass ribbon, however formed, is maintained at an elevated temperature, above its softening temperature, for a sufficient length of time that it achieves a desired surface finish requiring little, if any, additional surfacing for ultimate use in all applications where high quality glass sheet is used. In order to prevent oxidization of the liquid of the bath, especially when such liquid is tin or an alloy thereof, a controlled atmosphere is provided above the bath within the tank 10. After surfacing, the temperature of the ribbon 14 is reduced, so that it can be removed from the bath 12 and the tank 10.

At the exit end of the tank 10, there are provided a pair of take-out rolls 16 and 18 to lift the glass from the bath 12 and transfer the glass ribbon to annealing lehr 20 in which the temperature of the glass can be controllably reduced to avoid unequal cooling and the establishment of unequal stress and strain patterns from side-to-side of the ribbon.

Above the take-out rolls 16 and 18, there is a roof extension 22 from which a plurality of drapes or curtains 24 are hung terminating so as to engage the glass ribbon 14 supported on the take-out rolls 16 and 18. The curtains or drapes 24 serve to prevent or materially reduce the entrance of ambient air into the tank 10 and are generally made of a heat resistant fabric; for example, an asbestos fabric. There is also a lower tank extension 26 enclosing the take-out rolls 16 and 18 to prevent or reduce ambient air leakage into the tank 10 beneath the exiting ribbon 14. Additional seal means, such as spring pressed carbon blocks 27 contact the rolls 16 and 18.

The lehr 20 includes a plurality of spaced conveying rolls 28, which provide a major part of the tractive force to move the ribbon of glass 14 through the tank 10 for surfacing therein. The entrance end of the lehr is at least partially closed by one of the curtains or drapes 24 which engages the glass ribbon and by a front wall 29 to prevent the entrance of ambient air into the lehr and also to attempt to prevent the sting-out, i.e., atmosphere from the tank 10, from entering the lehr.

Even with the precautions taken to eliminate sting-out, apparently gases from the tank 10 do enter the lehr 20, and being tin-rich, cause deposits to form on the lehr rolls 28, and especially those lehr rolls near the entrance end of the lehr. As has been stated before, the glass ribbon contacts the rolls with the crusty and unequal deposits thereon and is damaged by such contact. The defect is, as before stated, known as roll print or dross print. The tractive force applied to the glass by the conveying rolls is, however, necessary to convey the glass ribbon, especially in the absence of other means which could mar the finished surfaces or be applied at such a location that it would not be uniformly applied.

It has been found that the defect known as roll print or dross print can be materially reduced if not entirely eliminated by at least partially supporting the glass ribbon on a gaseous fluid support, and for this purpose gaseous supporting means 30 are located between each adjacent pair of lehr rolls 28. Each means 30 provides a plurality of evenly distributed zones 32 of uniform nominal pressure on the lower side of the sheet adequate to at least partially support the ribbon being annealed. Gas flows from a rservoir 36 under high pressure into such zones, being uniformly throttled between the reservoir and each zone to restrict the passage of gas between the two. Each zone constitutes a unit of support area with respect to the glass ribbon to be at least partially supported. Within each zone, gas entering from the reservoir is diffused after throttling so as to avoid creation of localized jets normal to the glass surface and otherwise to equalize pressure and flow under normal conditions of operation. Provision is made for escape of the flow of gas emanating from each zone when covered by glass. In operation, the rate of flow from the reservoir to each zone is maintained at such level that the average clearance between the reference surface and the glass ribbon surface is not less than 0.001 inch and ordinarily not greater than 0.050 inch, preferably not greater than 0.025 inch for glass having a thickness of ⅛ inch and above, and in any case, the clearance is never more than 50 to 90 percent of the thickness of the glass being partially supported. Contact of the glass with a sufficient number of the conveying rolls is always to be maintained to provide the required tractive force on the glass.

Each of the supporting means 30, which can be referred to as a supporting unit, includes a flat bed of modules 32 in spaced but close juxtaposition each to the other and arranged geometrically like a mosaic. In the embodiment illustrated, all modules 32 have their upper termini of rectangular configuration and lying in a common plane. The modules 32 are arranged in successive rows crossing the intended path of travel of the glass ribbon, each row being at an angle of substantially 90 degrees with respect to the path and spaced close to the next adjacent row as hereinafter described in more detail.

Each module 32 (see especially FIG. 3 for module details) has a stem 34 of smaller cross sectional area than the upper terminus and each opens into a plenum chamber 36 positioned below the bed and acting as a support therefor. Each module is a substantially open-topped chamber and separated from other modules by an exhaust zone generally identified as 38. Gas is supplied from the plenum chamber 36 by way of the stem 34 which is hollow. A nozzle 40, in threaded arrangement with an opening 42 in the base of the module 32 and having a bore 44 connected with the bore 46 of the module stem 34 provides a gas inlet to the module chamber 48, and also functions to diffuse the gas by changing the direction of flow to a horizontal direction as the gas escapes and expands into the module chamber 48 through a plurality of orifices 50 in the nozzle 40. The orifices 50 are so disposed to prevent direct impingement of pressurized gaseous fluid against the glass above the module bed. They deliver gas to the module chamber in a path which is initially out of the path of the glass. As shown in FIG. 3 the initial path is toward the module side wall below the upper terminal edge thereof. However, the initial path may be downward, or as a horizontal spiral, or may be baffled or otherwise obstructed as long as it does not initially impinge against the glass. By feeding the gas into the large module chamber through an orifice which is smaller in cross-section than the module, the gas diffuses into the gas of the chamber, producing a diffused flow, thus ensuring substantially uniform pressure across the upper edges of the module. As shown in FIG. 1, pressurized gas is delivered to each plenum chamber from a suitable source by way of conduits 52. Of course, the gas should be filtered so as not to contain foreign matter which could not only damage the glass but to clog up or restrict gas passages and cause improper operation of the modules.

As shown in FIG. 3, the gas within each module escapes across the upper terminus of the module walls to zones, indicated at 38, of lower pressure between adjacent modules. The lateral flow of gas between the module wall and the glass results in a progressive pressure drop across the width of the wall. However, the resulting area of nonuniform support pressure directly above the wall thickness and the area of reduced pressure at the exhaust zones between the modules is minized by utilizing thin module walls and relatively low gas flow which permits the exhaust areas between the modules to be kept small yet adequate to exhaust the gas without building up bath pressure. The end result is a substantially uniform average support pressure. Exhaust of the gas is effected by pipe 54, so that excessive gas does not build up within the lehr 20. The pipe 54 may exhaust to the atmosphere or may be connected so as to effect a recycling of the gases.

Each module 32 of the embodiment being described is square and exhausts radially in all directions to the surrounding zones of lower pressure. The modules may vary in size, depending upon their desired operational characteristics. For example, they may be about ⅛ to 2 or 3 inches on each side, and need not be square, there being numerous other geometric or irregular shapes equally suitable. Generally, the modules are 1 inch squares, separated from each other approximately ⅛ inch.

As previously stated, the temperature of the glass ribbon being conveyed through the annealing lehr may be controlled by controlling the temperature of the gas discharged from the modules onto the lower surface of the sheet, and, in all cases the gas should be heated to avoid chilling the glass. Thus, gas heating means (not shown) are generally connected into the gas supply means which is connected to pipe 52. To reduce costs, it may be advisable to recycle all or a portion of the exhaust gas, so this can be accomplished by connecting exhaust pipe 54 to the gas supply means, as would be evident to one skilled in the art. The exhaust can, if desired, be taken from the side wall of the lehr or from any other convenient location where it will not interfere with the glass ribbon 14.

The gas pressure is adjusted so that the glass ribbon is supported in a plane tangent to the conveying rolls and contacting each conveyor roll so as to be driven thereby. For example, 10 pounds per square inch in line pressure is generally required with modules 1 inch square to at least partially support a glass ribbon ¼ inch thick yet maintain driving contact with adjacent rolls.

Another embodiment of the invention is illustrated in FIGS. 4 to 7 to which attention is now directed. In FIGS. 4 and 5, there is shown the tank 10 containing the liquid bath 12 on which a ribbon of glass 14 is floated to be discharged and thereafter annealed in an annealing lehr 20. At the exit end of the tank there are the take-out rolls 16 and 18 and the curtains or drapes 24 arranged with respect to the tank extensions 22 and 26 in the same manner as described with respect to FIG. 1. The lehr 20 is also provided with lehr or conveying rolls 28 and a front wall 29. The front wall 29 and the last curtain 24 cooperate in the same manner as described with respect to FIG. 1.

In the embodiment shown in FIGS. 4 to 7, a different form of gaseous supporting means is provided. Here, supporting apparatus is provided which affords partial support for those portions of the glass ribbon conveyed on rolls which lie between lines of mechanical support. The average fluid pressure exerted on the glass is maintained below that which would lift the glass from the rolls but sufficient to reduce the contact pressure of the glass on the rolls.

In this embodiment, the rolls 28 provide a plane of support for the glass ribbon 14 and are spaced from each other a sufficient distance to provide a space for channel-shaped members 60 having upper flanges 62, the outer and uppermost surfaces of which form a support bed slightly below the plane of support defined by the upper peripheries of the rolls 28. Two channel members 60 which terminate short of the side walls of the lehr are positioned between each pair of adjacent rolls and oriented with their vertical web portions 64 in back-to-back relationship but spaced to provide a vertical slot 66 across the width of the conveying path. The channel members are supported on a plenum chamber cover plate 68 which has slots 70 extending across the width of the conveying path to communicate the plenum pressure with the slots 66 and hence with the zones immediately beneath the glass ribbon 14. The channel members 60 are formed of a suitable refractory material, such as a ceramic or a metal, and are secured in position on the cover plate 68 by suitable means, not shown. All the channel members 60 could, if desired, be cast as a single ceramic insert.

The upper flanges 62 of each pair of channel members 60 which form a slot 66 extend in opposite directions away from the slot. The distal end of each upper flange 62 is proximate to the periphery of a roll 28 which is located on a corresponding side of a slot 66. In this manner, a chamber 72 having open ends and entrance slots 76 on each side of a roll 28 extends across the width of the conveying path and provides an escape conduit for the gas emitted from the slots 66 beneath the glass ribbon. The size of the slots 76 relative to the size of the slots 66, the relatively large vloume of chambers 72, and the pressure differential between the plenum chamber 78 to which gas is fed by conduit 80 and the ambient atmosphere within the lehr at the open ends determines the rate of gas flow and pressure build-up beneath a glass ribbon 14. In operation, the total area of the slots 76 (measured horizontally at the top thereof) is greater than the area of the slots 66 (measured at the same level) to provide adequate exhaust. The pressure in the plenum chamber 78 is sufficiently greater than the pressure at the open ends of the chamber 72 that a positive pressure is created beneath the glass ribbon and between adjacent rolls to support a portion of the weight of the glass ribbon.

The upper extremities of the channel members terminate somewhat below the upper extremities of the lehr rolls 28, thereby providing narrow paths or conduits 82 for transferring gas impinging against the glass from slots 66 to the exhaust slot 76. This achieves especially advantageous transfer of heat between the gas and the glass while yet providing a wide area of support for the glass between the rolls. To facilitate this support, the space 82 is shallow, rarely being more than 0.75 inch nor less than 0.05 inch, preferably not being over about 0.40 inch.

In the operation of the embodiment, a reservoir of gas under a pressure of about 1 to 3, or more, inches of water, is established in the plenum chamber 78 by feeding it thereto through conduit 80. In the event that the temperature of the glass ribbon is to be controlled, the temperature of the gas is controlled, and perhaps the plenum chamber is subdivided into various compartments to each receive gas of a different temperature. In any event, the gas flows into the slots 66 and over the upper edges of the channel members, impinging on the glass, and discharges through slots 76, out through the open ends and into the lehr 20. The exhausting gas passes in contact with the rolls 28 and tends to stabilize the temperature of the rolls, so that local tmeperature differences are minimized.

Figure 10:
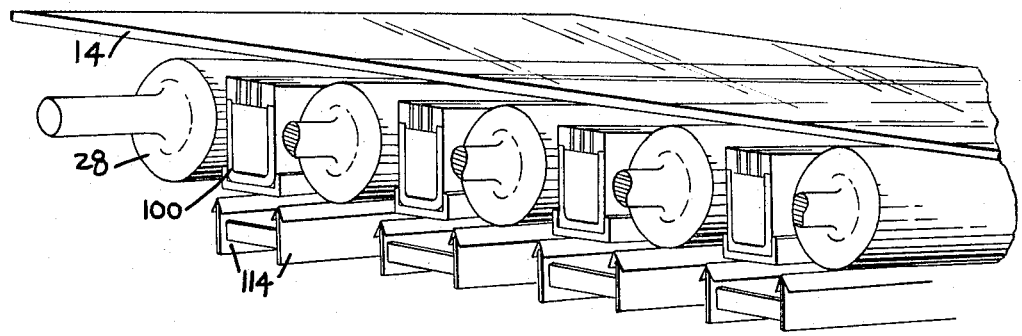
FIG. 10 is an enlarged perspective view of a portion of the embodiment of FIGS. 8 and 9 illustrating constructional details.

Attention is now directed to FIGS. 8 to 10 illustrating another embodiment of the invention. In FIG. 8, there is shown the exit end of the tank 10 containing the liquid bath 12 on which the ribbon of glass 14 is supported and from which the ribbon is removed by take-out rolls 16 and 18. The ribbon of glass 14 is conveyed through an annealing lehr 20 by conveyor rolls 28. Structures 22 and 26 are provided at the exit of the tank 10 and curtains or drapes 24 are provided at the exit of the tank. A front wall 29 partially closes the entrance of the lehr. All this structure is the same as that in the previous embodiments and functions in the same manner.

In the embodiment now being described, and similar to the other embodiments, the glass ribbon is at least partially supported by a gas as it is conveyed through the lehr 20. The structural arrangement for providing the gaseous support is somewhat different.

In this embodiment, plenum members 100 each constructed of a channel member 102 and a top member 104 having a plurality of spaced openings 106 therethrough are located between adjacent lehr rolls 28. Each plenum member is closed at opposite ends, as at 108, one or both ends being provided with an inlet pipe 109 for connection to a suitable source of pressurized gas, preferably heated, so as to avoid glass chilling.

Each plenum member 100 is supported on a truck 110 having grooved wheels 112 which ride on tracks or rails 114 spanning the lehr, so that the plenum members can be removed during start-up and not be damaged by broken glass from a broken ribbon, which condition may exist at start-up. To adjust the height of the plenum member 100 with respect to the plane of the glass which is the support plane established by the lehr rolls, there are provided jacks 116 near the ends of the plenum members. Of course, other means may be used to adjust the height of the plenum members 100. In order to remove the plenum members 100 from their operative positions during start-up, a carriage 118 is provided which is movable along spaced tracks or racks 120 running parallel to the lehr. The carriage 118 has rails 122 thereon which match the tracks or rails 114 as to spacing and height. Each plenum chamber can thus be moved out of its operative position and stored on the carriage 118 until it is desired to replace it in operative position.

Gas under sufficient pressure is fed into each plenum member to at least partially support the glass ribbon 14 and reduce the weight being applied to the conveying rolls 28.

In each embodiment thus described, the glass ribbon is at least partially supported by a gas discharged thereagainst, which gas reduces the contact pressure of the glass on the conveyor rolls. Thus, any build-up of deposits on the rolls will not cause the same degree of damage to the ribbon as would be caused in the absence of such gas support. The rolls 28, of course, still convey the glass ribbon 14 through the lehr 20.

I claim:

Apparatus for producing sheet glass comprising, a liquid bath for supporting a glass ribbon, a container for the liquid of the bath, means for maintaining the supported glass ribbon at an elevated temperature and for a sufficient length of time to achieve a desired surface finish and means for cooling the glass ribbon after it has achieved the desired surface finish so that it can be removed from the bath and from the container, means for removing the finished glass ribbon from the bath and container, and means for conveying the removed glass ribbon after removal from the bath and container, said conveying means including a series of spaced conveying rolls contacted by the glass ribbon to provide tractive force to the glass ribbon, means between adjacent pairs of conveying rolls to discharge a gas against the glass ribbon to at least partially support the glass ribbon and reduce the contact pressure of the glass ribbon on the conveying rolls, and means to supply the glass to said last-named means, said means between adjacent pairs of conveying rolls including an elongated box-like movable member having a series of openings in its top wall opposite the glass ribbon and through which gas is discharged, and means mounting said box-like means for movement to its operating position between adjacent pairs of conveying rolls and to an inoperative position removed from between said pairs of adjacent rolls.

References Cited by the Examiner

UNITED STATES PATENTS

| | | | |
|---|---|---|---|
| 3,223,498 | 12/1965 | Davidson | 65—25 |
| 3,223,501 | 12/1965 | Fredley et al. | 65—25 |
| 3,233,995 | 2/1966 | Javaux | 65—99 |

DONALL H. SYLVESTER, *Primary Examiner.*

G. R. MYERS, *Assistant Examiner.*

UNITED STATES PATENT OFFICE
CERTIFICATE OF CORRECTION

Patent No. 3,300,291                         January 24, 1968

George W. Misson

It is hereby certified that error appears in the above numbered patent requiring correction and that the said Letters Patent should read as corrected below.

Column 8, line 4, for "glass" read -- gas --.

Signed and sealed this 13th day of August 1968.

(SEAL)
Attest:

Edward M. Fletcher, Jr.                      EDWARD J. BRENNER
Attesting Officer                            Commissioner of Patents